(12) United States Patent
Gorokhov

(10) Patent No.: US 8,687,542 B2
(45) Date of Patent: Apr. 1, 2014

(54) METHOD OF IMPROVING THROUGHPUT IN A SYSTEM INCLUDING STICKY ASSIGNMENTS

(75) Inventor: Alexei Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1625 days.

(21) Appl. No.: 11/437,449

(22) Filed: May 18, 2006

(65) Prior Publication Data

US 2007/0271568 A1 Nov. 22, 2007

(51) Int. Cl.
*H04B 7/204* (2006.01)
*H04B 7/212* (2006.01)

(52) U.S. Cl.
USPC .......................................... 370/322

(58) Field of Classification Search
USPC .................. 370/322, 329, 341, 431, 443, 456
See application file for complete search history.

(56) References Cited

U.S. PATENT DOCUMENTS

| | | | |
|---|---|---|---|
| 6,075,779 A | 6/2000 | Agarwal et al. | |
| 6,453,151 B1 | 9/2002 | Kiang et al. | |
| 6,459,901 B1 | 10/2002 | Chawla et al. | |
| 7,864,740 B2 * | 1/2011 | Yang et al. | 370/337 |
| 2005/0130663 A1 * | 6/2005 | Hong et al. | 455/445 |
| 2005/0165949 A1 | 7/2005 | Teague | |
| 2005/0238053 A1 | 10/2005 | Iochi et al. | |
| 2006/0034173 A1 | 2/2006 | Teague et al. | |
| 2006/0291393 A1 * | 12/2006 | Teague et al. | 370/235 |
| 2007/0097927 A1 * | 5/2007 | Gorokhov et al. | 370/335 |
| 2007/0124062 A1 | 5/2007 | Janky et al. | |
| 2007/0291691 A1 | 12/2007 | Gorokhov | |
| 2009/0022098 A1 | 1/2009 | Novak et al. | |
| 2009/0060081 A1 * | 3/2009 | Zhang et al. | 375/267 |
| 2009/0219887 A1 * | 9/2009 | Barriac | 370/331 |

FOREIGN PATENT DOCUMENTS

| | | |
|---|---|---|
| CN | 1419789 | 5/2003 |
| DE | 10014396 A1 | 4/2001 |
| EP | 0619662 A2 | 10/1994 |
| EP | 0905922 | 3/1999 |
| JP | 7099499 A | 4/1995 |
| JP | H09512409 A | 12/1997 |
| JP | 11055179 | 2/1999 |
| JP | 2003514485 A | 4/2003 |
| JP | 2004104461 A | 4/2004 |
| JP | 2004343258 | 12/2004 |
| JP | 2008507904 | 3/2008 |
| RU | 2073913 | 2/1997 |
| WO | WO9205556 | 4/1992 |
| WO | WO9501706 A1 | 1/1995 |
| WO | WO0137451 | 5/2001 |

(Continued)

OTHER PUBLICATIONS

International Search Report and Written Opinion—PCT/US07/069187, International Search Authority-European Patent Office, Nov. 22, 2007.

(Continued)

*Primary Examiner* — Man Phan
*Assistant Examiner* — Kevin Lee
(74) *Attorney, Agent, or Firm* — Donald C. Kordich

(57) ABSTRACT

Methods and apparatuses are disclosed that provide conditional assignments to access terminals over resources assigned to other access terminals. Further, methods and apparatuses are disclosed for processing resources to determine whether an access terminal should utilize resources that have bee conditionally assigned.

51 Claims, 12 Drawing Sheets

(56) References Cited

FOREIGN PATENT DOCUMENTS

| WO | 0172061 A1 | 9/2001 |
| WO | WO2006020030 | 2/2006 |
| WO | 2006138379 A2 | 12/2006 |
| WO | 2007050828 A1 | 5/2007 |
| WO | 2007143363 A2 | 12/2007 |
| WO | WO-2009035904 A2 | 3/2009 |

OTHER PUBLICATIONS

Taiwan Search Report—TW096117851—TIPO—Jan. 15, 2011.
Yoon C. S., "Introduction of WiBro MAC Specification", Oct. 25, 2005.

* cited by examiner

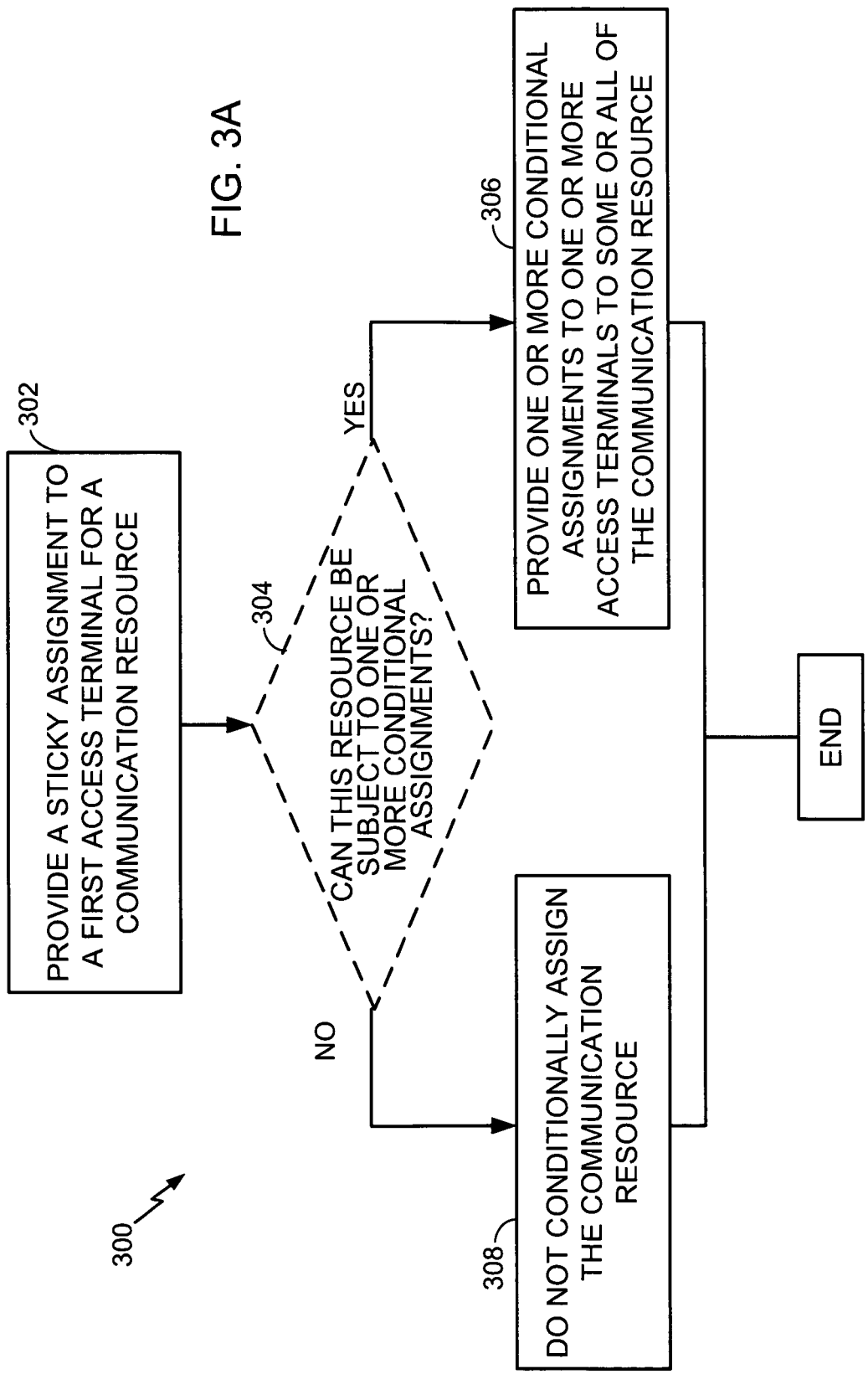

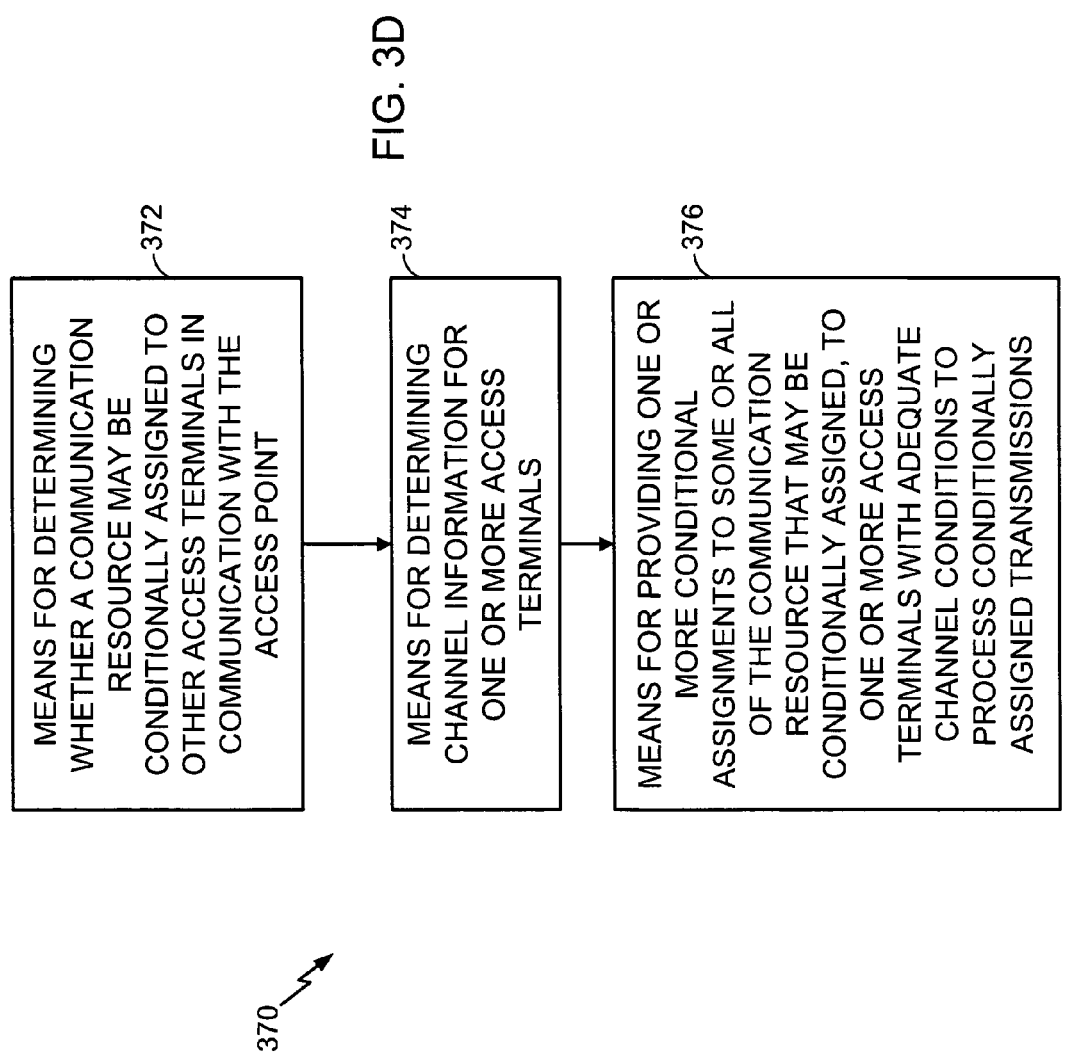

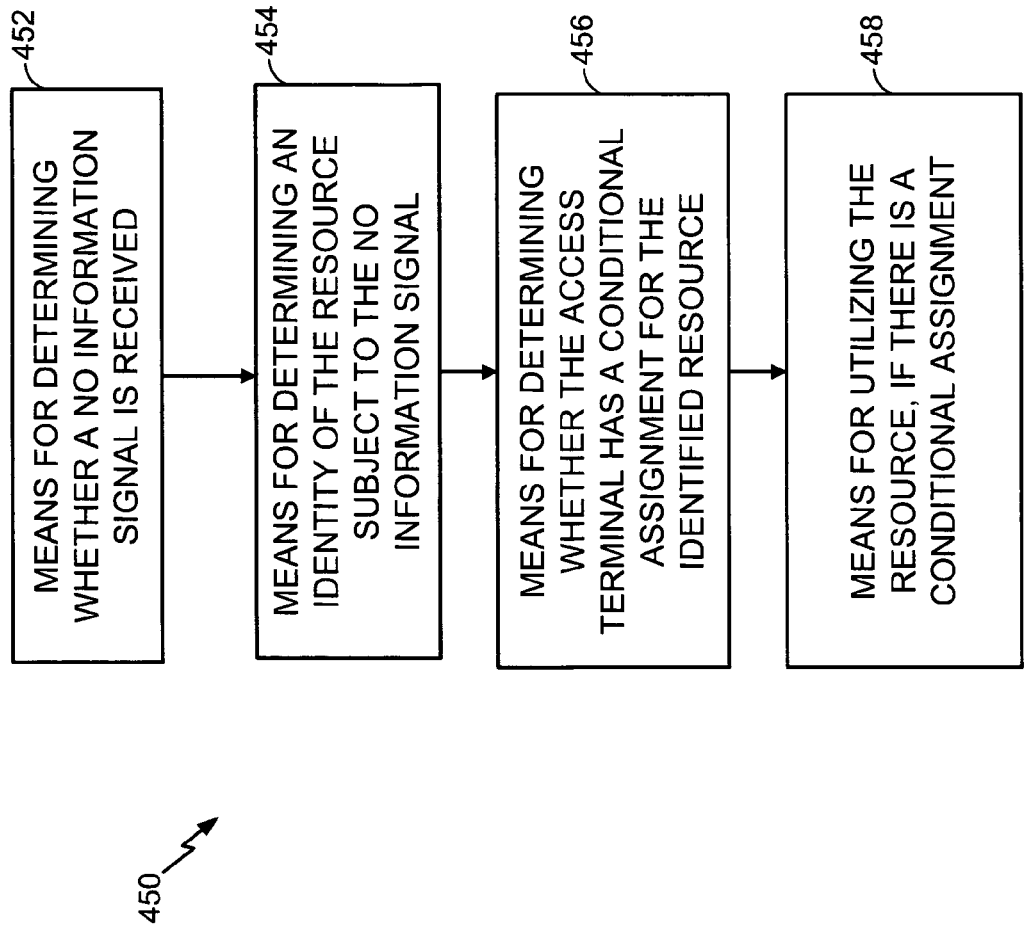

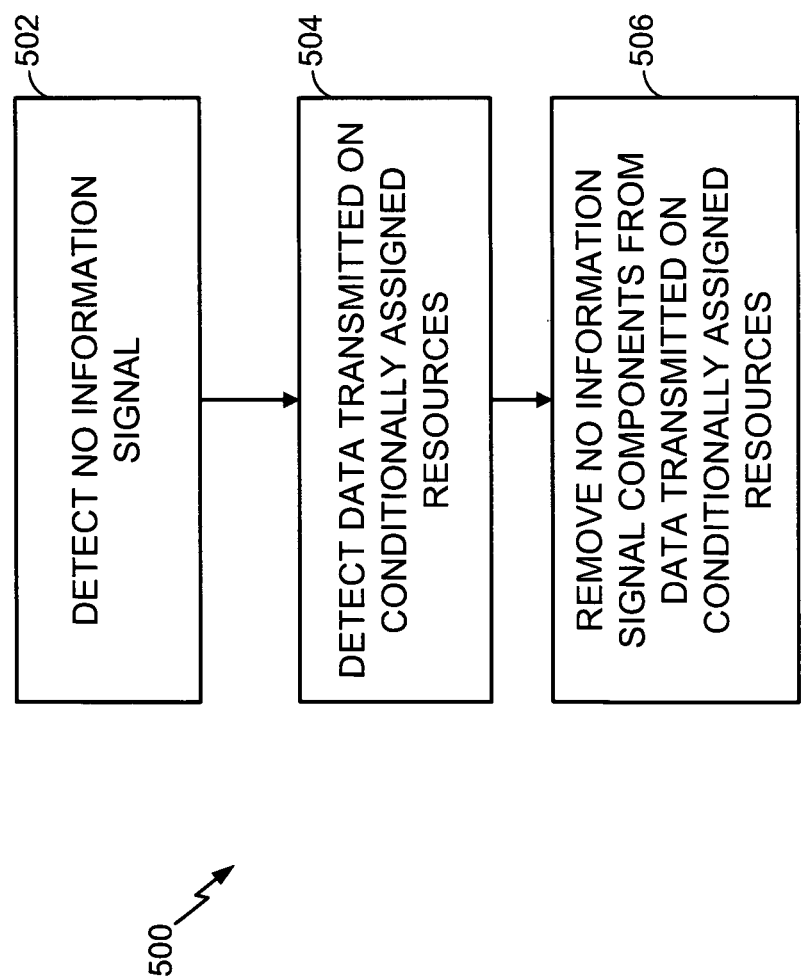

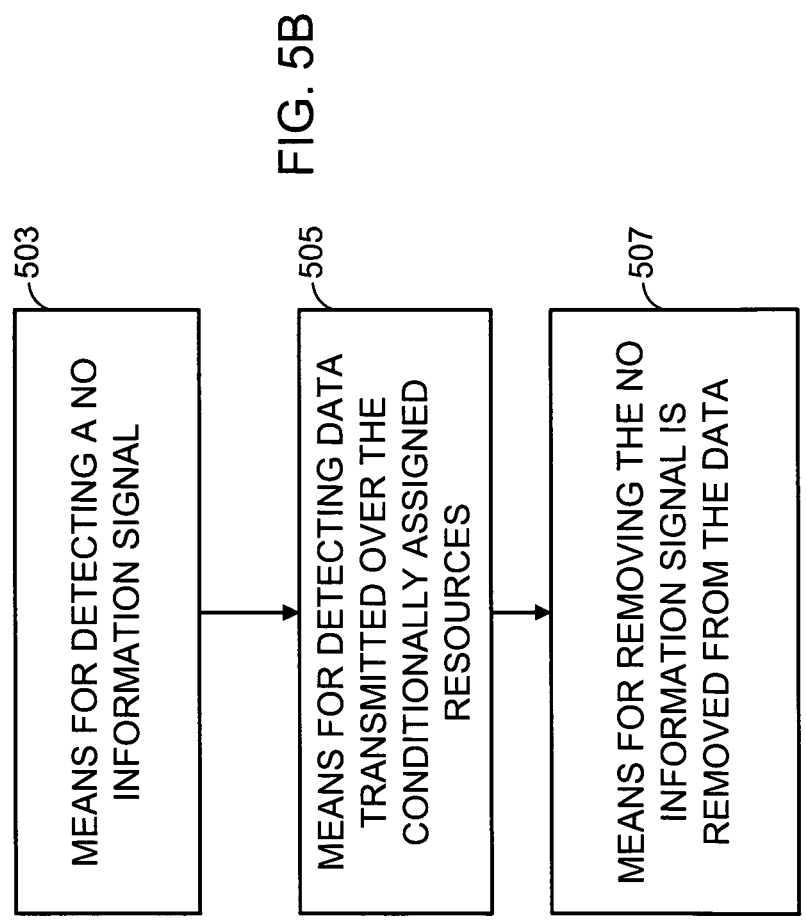

METHOD OF IMPROVING THROUGHPUT IN A SYSTEM INCLUDING STICKY ASSIGNMENTS

BACKGROUND

I. Field

The present document relates generally to wireless communication and amongst other things to assignments for wireless communication systems.

II. Background

Wireless communication systems are widely deployed to provide various types of communication such as voice, data, and so on. These systems may be multiple-access systems capable of supporting communication with multiple access terminals by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems. Typically, a wireless communication system comprises several base stations, wherein each base station communicates with the mobile station using a forward link and each mobile station (or access terminal) communicates with base station using a reverse link.

Generally, when a transmitter of an access point or an access terminal completes transmitting a set of actual data and before transmitting another set of actual data packet, a break (also referred to as "a gap") in transmission occurs. The gap in data transmission refers to duration of time when no actual data is transmitted on the assigned resource. In a typical communication system, in the case of the access point transmitter, a possibility exists that the gap in transmission may be construed as, a loss of the assigned resource. In this case, those resources are lost and bandwidth that is available is not fully utilized. Further, the gap in transmission may be interpreted as an indication that the assigned resources have been deassigned. In both cases, it is inefficient and may lower the quality and reliability of the communication system.

Thus, there is a need for a system and method to provide an indication of a gap in the transmission, so that the access point and access terminal do not interpret the gap in transmission as indication of not requiring the assigned resources or as an indication that the assigned resources were no longer available.

SUMMARY

In certain aspects, access terminals are assigned conditional resources and process signals received over the resource to determine whether the resources, subject to the conditionals assignment, should be utilized by the access terminal.

In certain aspects, a method of assigning resources to multiple access terminals comprises generating a first assignment for a first access terminal and generating a second assignment for a second access terminal, the second assignment being conditional and identifying the resources.

In further aspects, an apparatus comprises a memory and a processor configured to generate a first assignment for a first access terminal and a second assignment for a second access terminal, the second assignment being conditional and identifying the first resources.

In additional aspects, a method of processing signals received at an access terminal, the method comprises determining whether a no information signal is received corresponding to communication resources, determining whether the access terminal is conditionally assigned the communication resources, and communicating utilizing the communication resources if the no information signal is received and access terminal is conditionally assigned the communication resources.

In other aspects, an access terminal comprises a memory and a processor configured to determine whether the access terminal is conditionally assigned communication resources for which a no information signal has been received and to instruct communication utilizing the communication resources if the no information signal is received and access terminal is conditionally assigned the communication resources.

Various aspects and embodiments are described in further detail below. The applications further provide methods, processors, transmitter units, receiver units, base stations, terminals, systems, and other apparatuses and elements that implement various aspects, embodiments, and features, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein:

FIG. 3A shows a process for assigning access terminals to overlapping resources;

FIG. 3D shows another apparatus for assigning access terminals to overlapping resources;

FIG. 4B shows an apparatus for utilizing conditionally assigned resources;

FIG. 5A shows a process for processing signals received via a conditional assignment;

FIG. 5B shows an apparatus for processing signals received via a conditional assignment;

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs. The word "listening" is used herein to mean that a recipient device (access point or access terminal) is receiving and processing data received on a given channel.

Figure 1:
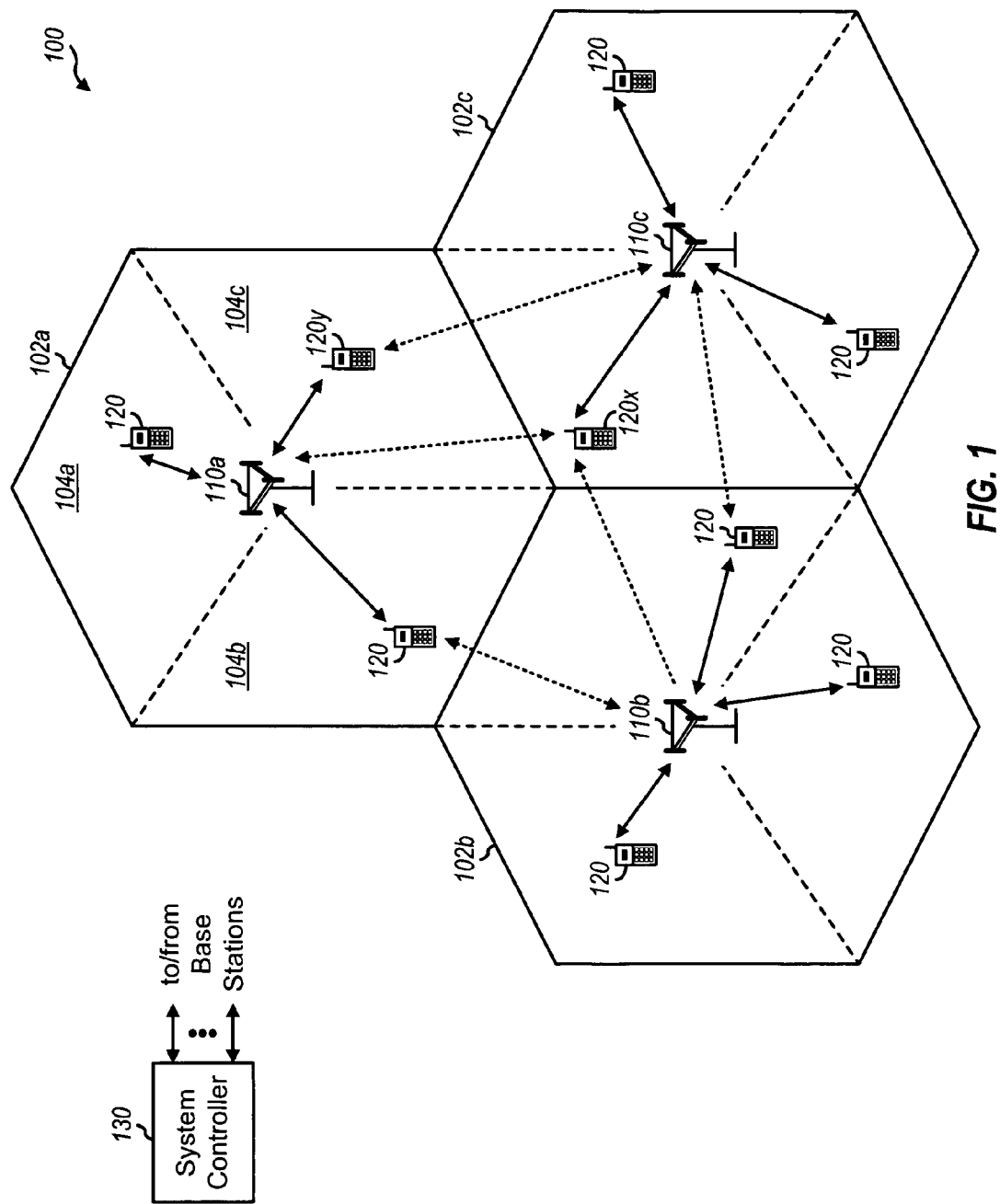
FIG. 1 shows a diagram of a wireless multiple-access communication system.

FIG. 1 shows a wireless communication system 100 with multiple access points (APs) 110 and multiple terminals 120. A base station is a station that communicates with the terminals. A base station may also be called, and may contain some or all of the functionality of, an access point, a Node B, and/or some other network entity. Each access point 110 provides communication coverage for a particular geographic area 102. The term "cell" can refer to an access point and/or its coverage area depending on the context in which the term is used. To improve system capacity, an access terminal coverage area may be partitioned into multiple smaller areas, e.g., three smaller areas 104a, 104b, and 104c. Each smaller area is served by a respective base transceiver subsystem (BTS). The term "sector" can refer to an AP and/or its coverage area depending on the context in which the term is used. For a sectorized cell, the APs for all sectors of that cell are typically co-located within the base station for the cell. The signaling transmission techniques described herein may be used for a system with sectorized cells as well as a system with un-sectorized cells. For simplicity, in the following description, the term "base station" is used generically for a station that serves a sector as well as a station that serves a cell.

Terminals 120 are typically dispersed throughout the system, and each terminal may be fixed or mobile. A terminal may also be called, and may contain some or all of the functionality of, a mobile station, a user equipment, and/or some other device. A terminal may be a wireless device, a cellular phone, a personal digital assistant (PDA), a wireless modem card, and so on. A terminal may communicate with zero, one, or multiple base stations on the forward and reverse links at any given moment.

For a centralized architecture, a system controller 130 couples to APs 110 and provides coordination and control for these base stations. System controller 130 may be a single network entity or a collection of network entities. For a distributed architecture, the APs may communicate with one another as needed.

The techniques described herein provide using an indication of a gap in transmission for an access terminal having a "sticky assignment" for other access terminals to receive and transmit signals to improve throughput for other access terminals.

Sticky assignments allow the system controller 130, to reduce assignment overhead. Sticky assignments allow the recipient of a given resource to use the assigned resource to perform multiple communications (transmission or reception) without requesting a new assignment for each communication. Using an assignment message, the AP 110 provides resource assignment information, for example a channel identification, to the AT 120. Once, the assignment information is received, the AT 120 transmits actual data on the assigned reverse link channel or a receive actual data on the assigned forward link assignment (resource). In a sticky assignment, the assigned channel continues to be assigned to the AT 120. Thus, at various times during the period that a channel is assigned, no actual data is transmitted or received by the AT 120 or the AP 110. Therefore, a first data pattern, which may be an erasure signature packet, is used to fill in the gaps in transmission. The length, the construction and the data rate of the erasure signature packet may vary based on available resources. Available resources may be determined by the system controller 130 or the AP that is in communication with the AT. For example, if the receiving entity has the resources to process erasure signature packets having more information bits (for example, 3 bits), the length of erasure signature packet is adjusted to provide more information bit. This may allow the receiving entity to easily determine that the packet received was an erasure signature packet. Also, the power level at which the erasure signature packets are transmitted may vary in enough to transmit the erasure sequence at power lever low enough that transmission of the erasure sequence does not cause significant interference.

Further, in certain aspects, other ATs then the one that is intended to receive the first data pattern may read the first data pattern. These ATs may then utilize the resources that are not being used by the AT for which the first data pattern was intended.

As used herein, resources or communication resources may refer to a carrier frequency, time slot, an number of tones or subcarriers of an OFDMA system, one or more contiguous blocks of OFDM symbols and subcarriers, e.g. block of 8 symbols by 16 subcarriers, a group of non-contiguous combinations of OFDM symbols and subcarriers, a logical resource, e.g. a node of a channel tree or a frequency hop sequence, or any other resource.

Figure 2:
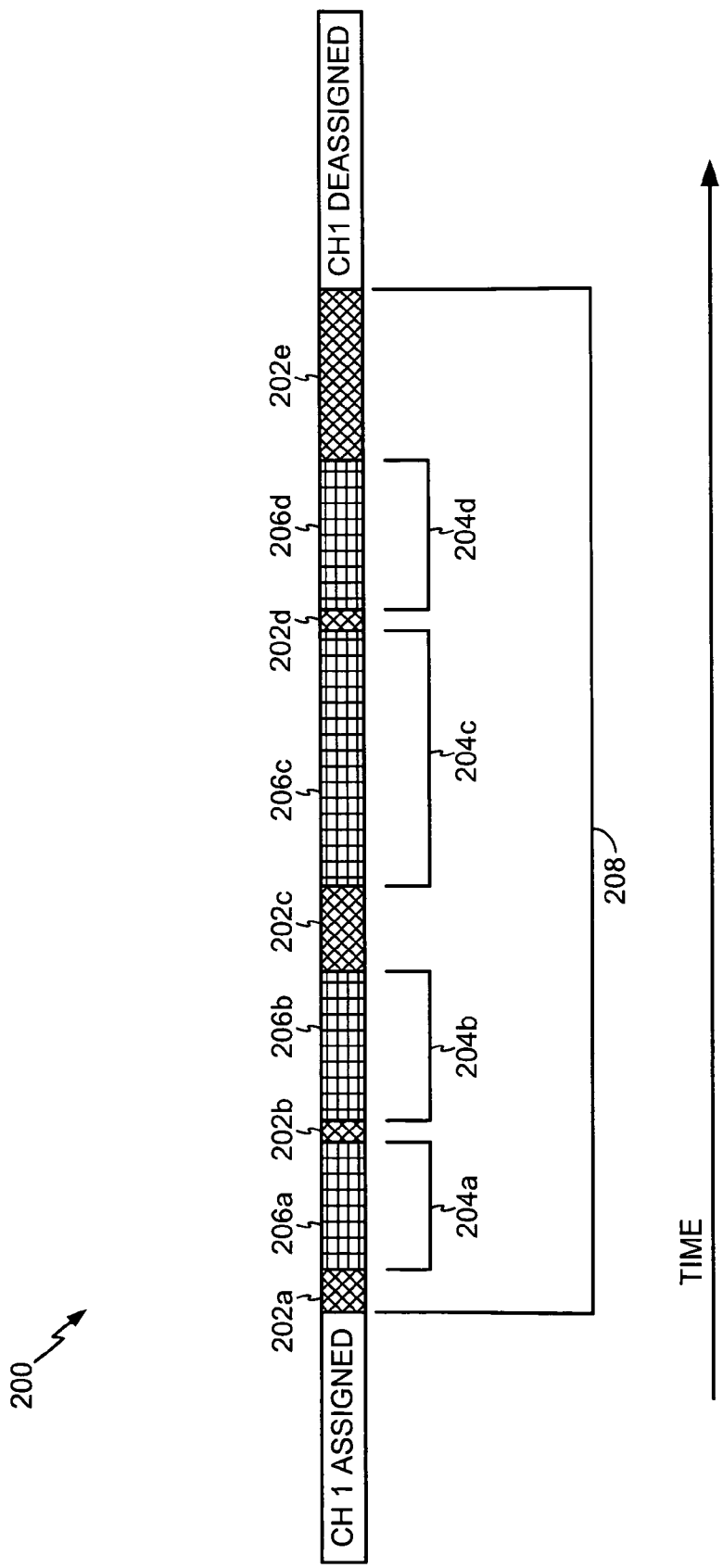
FIG. 2 shows an illustration of data traffic on an assigned channel during that uses a sticky assignment concept.

FIG. 2 shows an illustration 200 of data traffic on an assigned channel during the use of a sticky assignment concept. The sticky assignment duration 208 is generally between an assignment and a deassignment, loss of the session, although it may be for a period of fixed duration including multiple transmissions. During the sticky assignment duration 208, there may be several occurrence of transmission of data, for example 202a-202d, wherein transmit data packets are transmitted. Generally, data is not always transmitted continuously for the duration of sticky assignment 208, thus leaving gap portions, for example, 204a-204d. A no information signal 206a-206d that represents that no transmission is occurring over the resources corresponding to the assignment may be transmitted so that the sticky assignment is not terminated prior to end of the duration 208. The no information signal may be a fixed erasure signature packet or a message carrying one or more bits representing a unique pattern of data. In other words, the erasure signature packet fills the gap portions 204a-d with unique patterns and keeps the resources from getting terminated. The erasure signature packet may be a unique identifier that is known to both transmitter and the receiver prior to using the erasure signature packets.

However, in the above situation, the resources subject to the sticky assignment are not being utilized for any communication with the access terminal. Therefore, unused capacity will exits in such situations. Therefore, in some aspects, other access terminals may be conditionally assigned to the resources subject to the sticky assignment, and would, when receiving the no information signal, be able to utilize the resources subject to the sticky assignment.

The conditional assignments may be sticky conditional assignments or may be conditional assignments for a single communication. The conditional assignment, and the sticky assignment, may be for forward link communication, reverse link communication, or both.

The no information signal may identify the access terminal for the sticky assignment, the identification of the sector or access point that is transmitting the no information signal, or the access terminals that are subject to the conditional assignment. In this way multiple access terminals may be subject to conditional assignment, of all or some, of the same resources that are subject to an original sticky assignment.

The no information signal may be transmitted at a transmit power level that is lower than a predetermined threshold. The threshold may be predetermined and indicates a transmit power level such that transmitting above the threshold would cause interference. The erasure signature packets may also be transmitted at low data rate.

In certain aspects, the no information signal may be a beacon signal, a pseudo-noise (PN) sequence, or some other signal type. Further, in some aspects as described above, the no information signal may be transmitted over the resources that are conditionally assigned.

FIG. 3A shows a process 300 for assigning access terminals to overlapping resources. A sticky assignment is provided for a first access terminal for a communication resource, block 302. A determination is made whether the communication resource may be conditionally assigned to other access terminals in communication with the access point, block 304. The determination may be made based the type of communication session the first access terminal is being provided, e.g. if the first access terminal is being assigned the communication resource for voice over internet protocol (VoIP) communication the communication resource may be able to be assigned for conditional communication. Alternatively, the resources may be partitioned such that certain resources are subject to conditional assignments, along with a sticky assignment for a particular access terminal. Further, it should be noted that block 304 may be omitted, if certain resources are predefined as having the ability to be conditionally assigned to other access terminals when subject to sticky assignments.

If the resource is not capable of being subject to a conditional assignment, then the communication resource will not be subject to conditional assignments, block 308. If the resource is capable of being subject to a conditional assignment, then conditional assignments for one or more access terminals may be provided, block 306. The conditional assignment, or assignments, may for all or some of the resources. They may be for one or more additional access terminal, as well.

As discussed above, it should be noted that block 302 and block 304 may be performed in any order or at different times.

Figure 3B:
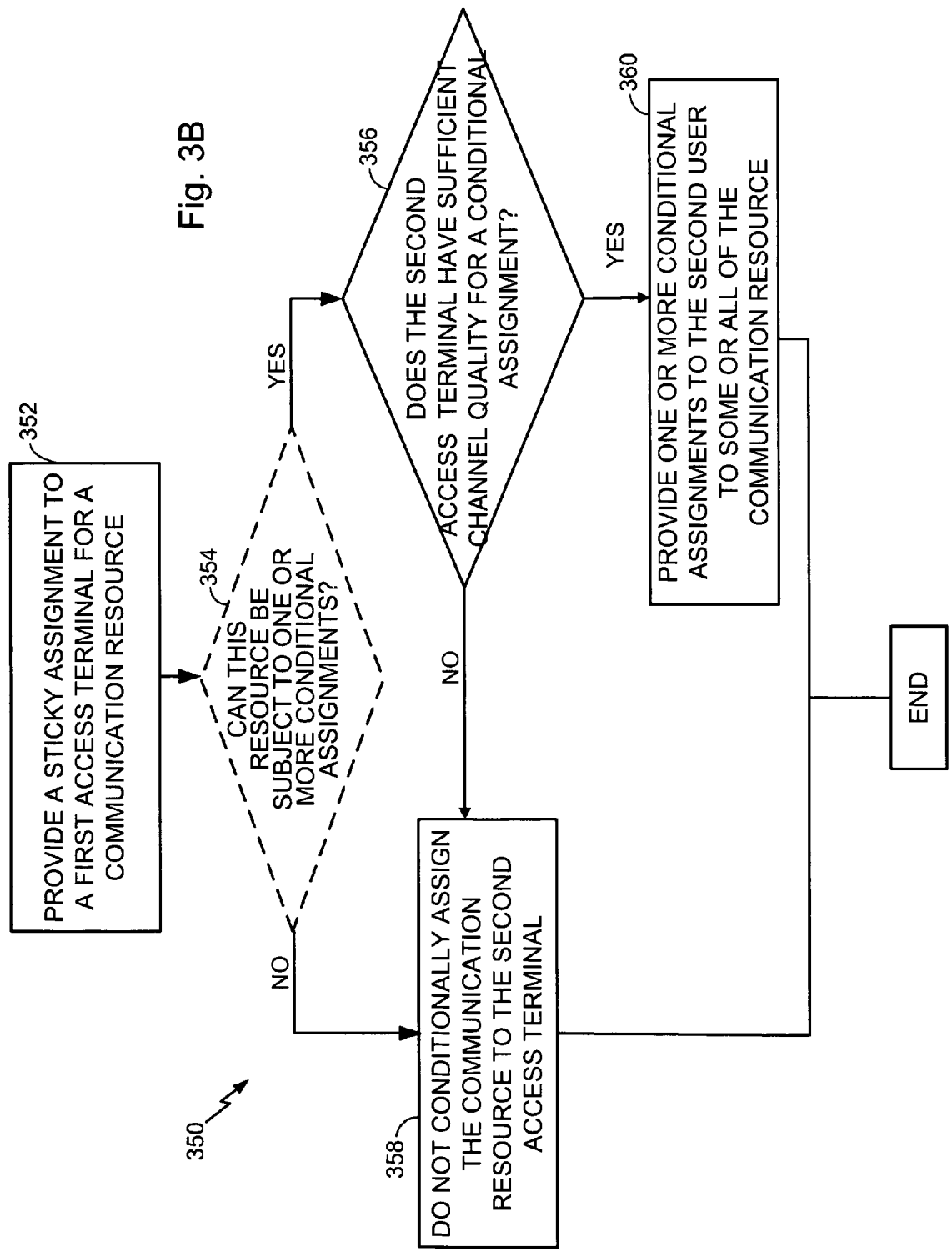
FIG. 3B shows another process for assigning access terminals to overlapping resources.

FIG. 3B shows a process 350 for assigning access terminals to overlapping resources. A sticky assignment is provided for a first access terminal for a communication resource, block 352. A determination is made whether the communication resource may be conditionally assigned to other access terminals in communication with the access point, block 354. The determination may be made based the type of communication session the first access terminal is being provided, e.g. if the first access terminal is being assigned the communication resource for voice over internet protocol (VoIP) communication the communication resource may be able to be assigned for conditional communication. Alternatively, the resources may be partitioned such that certain resources are subject to conditional assignments, along with a sticky assignment for a particular access terminal. Further, it should be noted that block 354 may be omitted, if certain resources are predefined as having the ability to be conditionally assigned to other access terminals when subject to sticky assignments.

If the resource is not capable of being subject to a conditional assignment, then the communication resource will not be subject to conditional assignments, block 358. If the resource is capable of being subject to a conditional assignment, then a determination is made whether another access terminal has sufficient channel quality to be provided a conditional assignment, block 356. The determination may be based upon channel quality metrics provided by the access terminal, measured by the access point, or combinations thereof. This determination may be utilized because, in certain aspects, demodulation of the information transmitted to the conditionally access terminal, over the conditionally assigned resources, may include the no information signal, and potentially other information such as acknowledgements, superimposed over the data in the conditionally assigned resources. Thus, it may be beneficial to assign access terminals with channels that will have less difficulty demodulating such signals.

If the other access terminal has sufficient channel quality, then it may be provided the conditional assignment, block 360. Otherwise, the other access terminal is not provided with a conditional assignment for the resources, block 358.

The conditional assignment, or assignments, may for all or some of the resources. They may be for one or more additional access terminal, as well. As discussed above, it should be noted that block 352 and block 354 may be performed in any order or at different times.

It should be noted, that the determination discussed with respect to block 356, may be made for available conditionally assignable resources available for an access terminal at one time, or may be made on a resource by resource basis. Further, process 350 may be performed for each other access terminal individually, or block 356 may be performed for one or more terminals, after performance of block 354, iteratively for example.

Figure 3C:
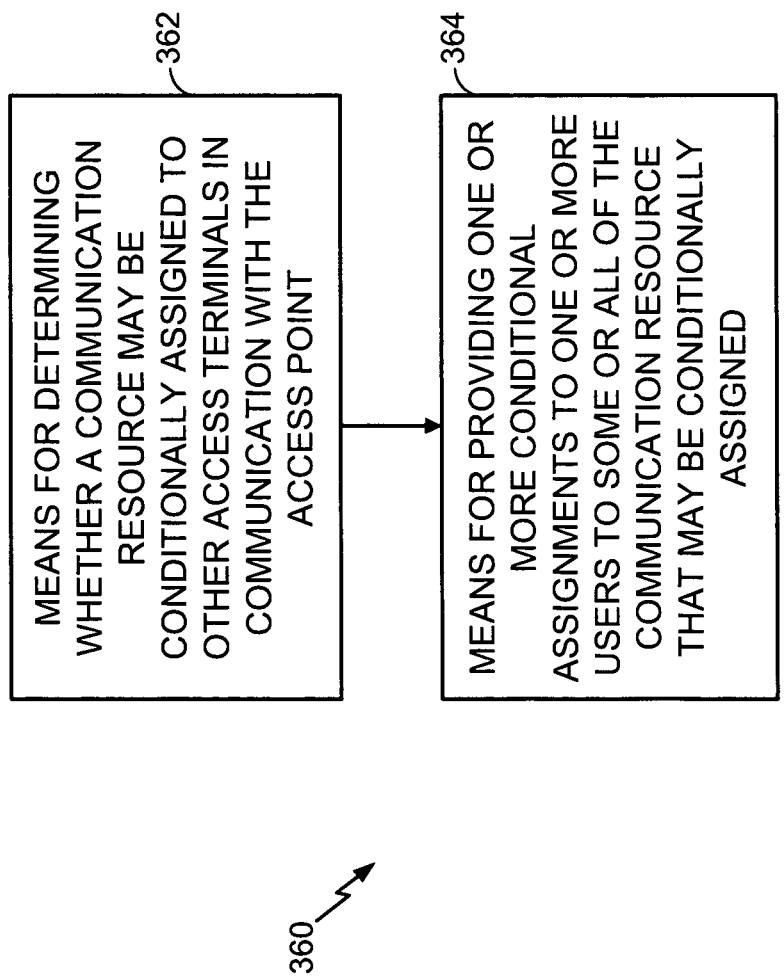
FIG. 3C shows an apparatus for assigning access terminals to overlapping resources.

FIG. 3C shows an apparatus 360 for assigning access terminals to overlapping resources. Means 362 for determining whether a communication resource may be conditionally assigned to other access terminals in communication with the access point is coupled to means 364 for providing one or more conditional assignments to one or more access terminals to some or all of the communication resource that may be conditionally assigned.

FIG. 3D shows an apparatus 370 for assigning access terminals to overlapping resources. Means 372 for determining whether a communication resource may be conditionally assigned to other access terminals in communication with the access point is coupled to means 374 for determining channel information for one or more access terminals. Means 374 is coupled to means 376 for providing one or more conditional assignments to some or all of the communication resource that may be conditionally assigned, to one or more access terminals with adequate channel conditions to process conditionally assigned transmissions.

Figure 4A:
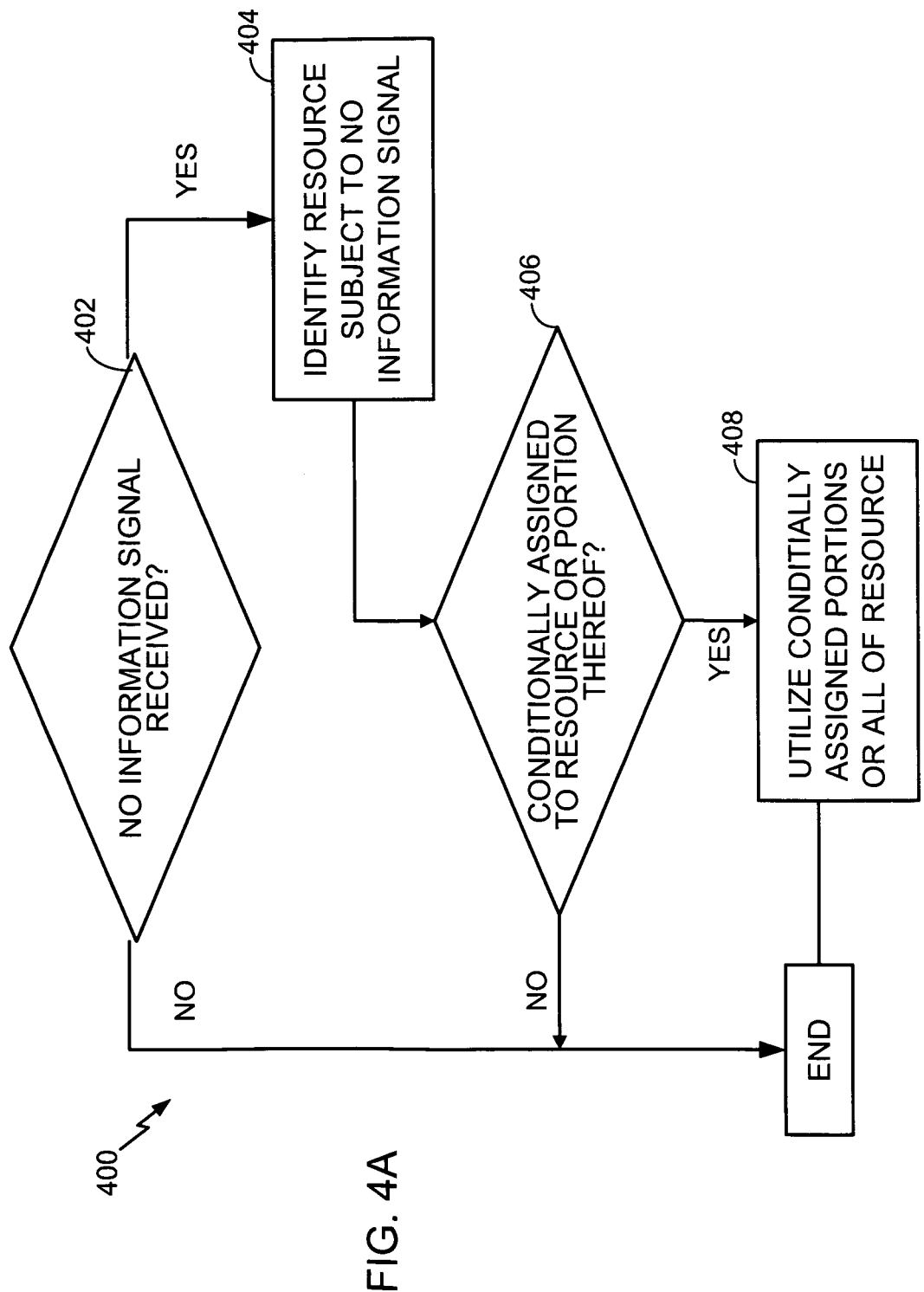
FIG. 4A shows a process for utilizing conditionally assigned resources.

FIG. 4A shows a process 400 for utilizing conditionally assigned resources. A determination is made if a no information signal is received, at an access terminal, block 402. As discussed above the no information signal may be an erasure signature packet(s). The determination may be made based upon a unique sequence and whether an identification sequence is provided that corresponds to such a packet. The identification sequence may be for the sector, or access point, or for the access terminal(s) or terminals subject to the assignment. In addition, in some cases these may be broadcast packets.

If the no information signal is detected, an identity of the resource subject to the no information signal is determined, block 404. In some aspects, the no information signal is transmitted over one or more symbols that are part of the resource. In such, cases, the determination is a direct correspondence. In other aspects, the location of the no information signal in a preamble or other control channel resource may correspond to a resource location in the data or other traffic resource.

The access terminal may then determine whether it has a conditional assignment for the resource, or part of the resource, block 406. This determination may be made based upon a previously received conditional assignment. The access terminal may then communicate utilizing all or its assigned portion of the resource, block 408. The communication may include demodulating and decoding data in the resource, where the communication is for the forward link, may include transmission over the resource where the communication is reverse link, or a combination of reverse link and forward link resources.

In certain aspects, the conditional assignment may be for both the forward link and reverse link, e.g. where the reverse link assignment is channelized with respect to forward link assignment or where the resource identifier, for example a hop index identifier, is the same for the forward and reverse links.

The above approach may be performed for each conditional assignment that an access terminal is provided. An access terminal may be provided multiple conditional that each relates a different resource, where each resource may relate to different access terminals or may include multiple resources from one or multiple access terminals. For example, a data access terminal may be provided conditional assignments for the resources of multiple VoIP access terminals.

FIG. 4B shows an apparatus 450 for utilizing conditionally assigned resources. Means 452 for determining whether a no information signal is received is coupled to means 454 for determining an identity of the resource subject to the no information signal. Means 454 is coupled to means 456 for determining whether the access terminal has a conditional assignment for the identified resource. Means 456 is coupled to means 458 for utilizing the resource, if there is a conditional assignment.

FIG. 5A shows a process for processing signals received via a conditional assignment. A no information signal is detected, block 502. Then the data transmitted over the conditionally assigned resources is detected, block 504. Then, during demodulation, the no information signal is removed from the data, block 506.

It should be noted, that FIG. 5 is applied where the no information signal overlaps the data signals in terms of time, frequency, codes, or combinations thereof, e.g. the same sub-carrier-OFDM symbol combinations. In other instances, as discussed above, the resources used to transmit the no information signal may be different than those used to transmit the information to the conditionally assigned terminal, e.g. different sub-carrier-OFDM symbol combinations.

FIG. 5B shows an apparatus for processing signals received via a conditional assignment. Means 503 for detecting a no information signal is coupled to means 505 for detecting data transmitted over the conditionally assigned resources. Means 505 is coupled to means 507 for removing the no information signal is removed from the data.

Figure 6:
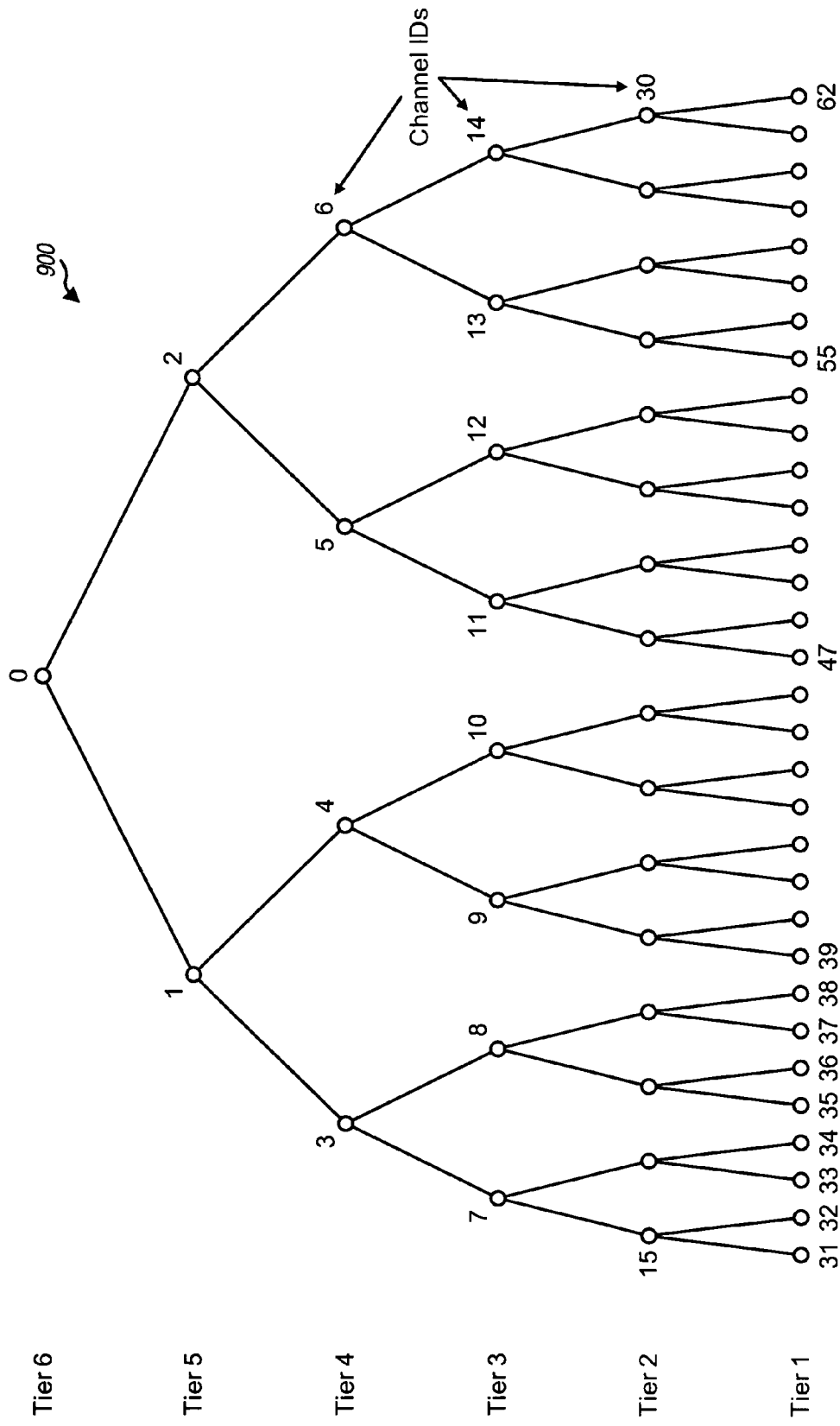
FIG. 6 shows a binary channel tree.

FIG. 6 shows a binary channel tree 900. For the embodiment shown in FIG. 6, S=32 subcarrier sets are available for use. A set of traffic channels may be defined with the 32 subcarrier sets. Each traffic channel is assigned a unique channel ID and is mapped to one or more subcarrier sets in each time interval. For example, a traffic channel may be defined for each node in channel tree 900. The traffic channels may be sequentially numbered from top to bottom and from left to right for each tier. The largest traffic channel corresponding to the topmost node is assigned a channel ID of 0 and is mapped to all 32 subcarrier sets. The 32 traffic channels in the lowest tier 1 have channel IDs of 31 through 62 and are called base traffic channels. Each base traffic channel is mapped to one subcarrier set.

The tree structure shown in FIG. 6 places certain restrictions on the use of the traffic channels for an orthogonal system. For each traffic channel that is assigned, all traffic channels that are subsets (or descendants) of the assigned traffic channel and all traffic channels for which the assigned traffic channel is a subset are restricted. The restricted traffic channels are not used concurrently with the assigned traffic channel so that no two traffic channels use the same subcarrier set at the same time.

In an aspect, an ACK resource is assigned to each traffic channel that is assigned for use. An ACK resource may also be called an ACK sub-channel or some other terminology. An ACK resource includes pertinent resources (e.g., a spreading code and a set of clusters) used to send an ACK message. In one aspect, the ACK messages for each traffic channel may be sent on the assigned ACK resource. The assigned ACK resources may be signaled to the terminal.

In another aspect, an ACK resource is associated with each of the base traffic channels in the lowest tier of a channel tree. This aspect allows for assignment of the maximum number of traffic channels of the minimum size. A larger traffic channel corresponding to a node above the lowest tier may use (1) the ACK resources for all base traffic channels under the larger traffic channel, (2) the ACK resource for one of the base traffic channels, e.g., the base traffic channel with the lowest channel ID, or (3) the ACK resources for a subset of the base traffic channels under the larger traffic channel. For options (1) and (3) above, an ACK message for the larger traffic channel may be sent using multiple ACK resources to improve the likelihood of correct reception. If multiple packets are sent in parallel, e.g., using multiple-input multiple-output (MIMO) transmission, then a larger traffic channel with multiple base traffic channels may be assigned for the transmission. The number of base traffic channels is equal to or greater than the number of packets. Each packet may be mapped to a different base traffic channel. The ACK for each packet may then be sent using the ACK resource for the associated base traffic channel.

An access terminal for a conditional assignment, may in some aspects, transmit its ACK as if it were assigned to the resource, e.g. by transmitting an ACK on the lowest base node for the resource that was conditionally assigned.

It should be noted that acknowledgements transmitted by a conditionally assigned access terminal for data received over conditionally assigned resources may be provided without a channelized acknowledgement. For example, using a common acknowledgement or signaling channel for all access terminals or groups of access terminals.

Figure 7:
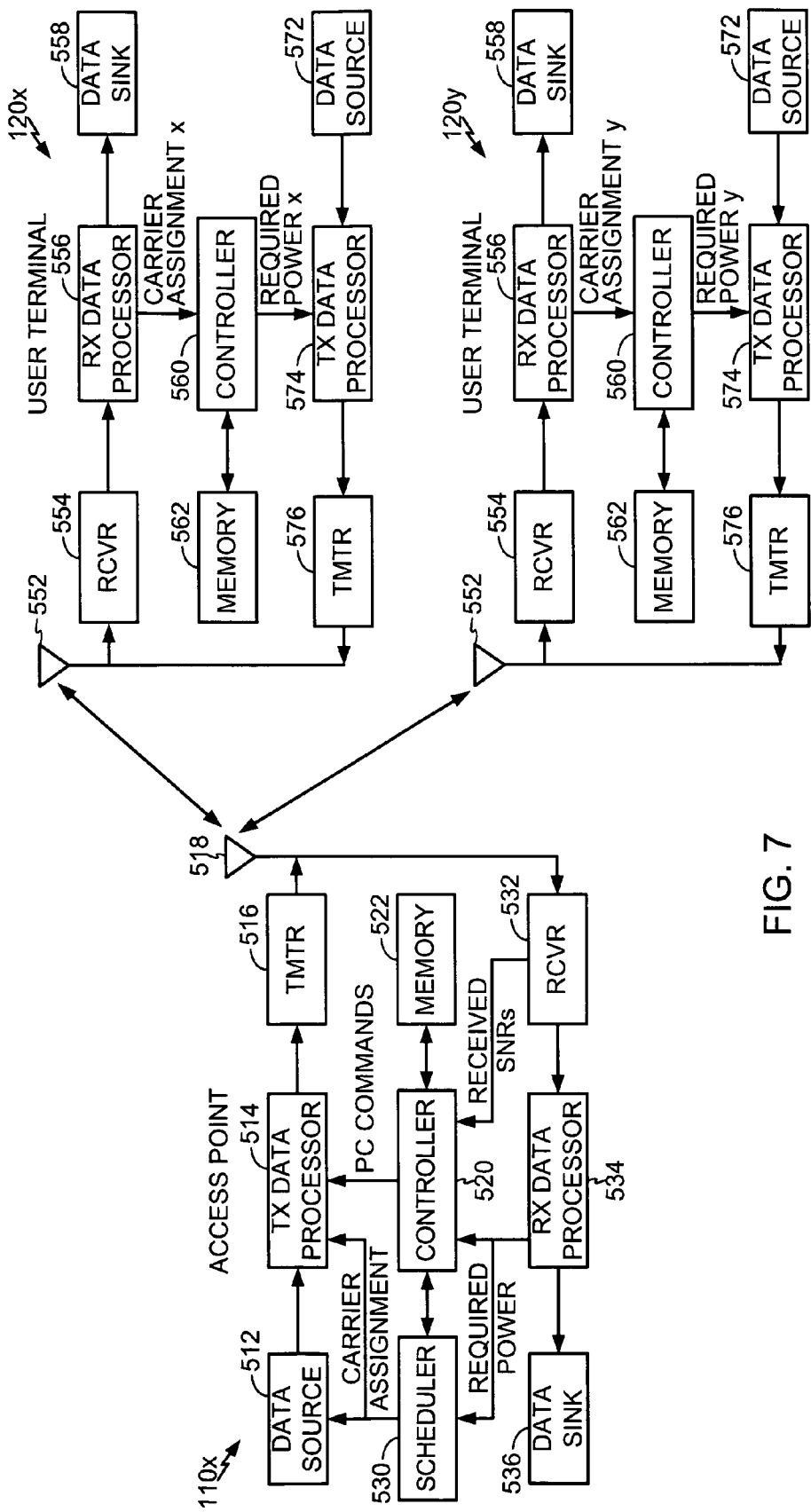
FIG. 7 shows a block diagram of an embodiment of an access point and two terminals.

FIG. 7 shows a block diagram of an embodiment of an AP 110x and two ATs 120x and 120y in multiple-access multi-carrier communication system 100. At AP 110x, a transmit (TX) data processor 514 receives traffic data (i.e., information bits) from a data source 512 and signaling and other information from a controller 520 and a scheduler 530. For example, controller 520 may provide power control (PC) commands that are used to adjust the transmit power of the active ATs, and scheduler 530 may provide assignments of carriers for the ATs. These various types of data may be sent on different transport channels. TX data processor 514 encodes and modulates the received data using multi-carrier modulation (e.g., OFDM) to provide modulated data (e.g., OFDM symbols). A transmitter unit (TMTR) 516 then processes the modulated data to generate a downlink modulated signal that is then transmitted from an antenna 518.

At each of ATs 120x and 120y, the transmitted and modulated signal is received by an antenna 552 and provided to a receiver unit (RCVR) 554. Receiver unit 554 processes and digitizes the received signal to provide samples. A received (RX) data processor 556 then demodulates and decodes the samples to provide decoded data, which may include recovered traffic data, messages, signaling, and so on. The traffic data may be provided to a data sink 558, and the carrier assignment and PC commands sent for the terminal are provided to a controller 560.

Controller 560 directs data transmission on the uplink using the resources that have been assigned to the terminal and indicated in the received assignment. Controller 560 further injects the erasure signature packets when the there is not actual data to transmit, yet desires to keep the assigned resources.

Controller 520 directs data transmission on the downlink using the resources that have been assigned to the terminal. Controller 520 further injects the erasure signature packets when the there is not actual data to transmit, yet desires to keep the assigned resources.

For each active terminal 120, a TX data processor 574 receives traffic data from a data source 572 and signaling and other information from controller 560. For example, controller 560 may provide information indicative of channel quality information, required transmit power, the maximum transmit power, or the difference between the maximum and required transmit powers for the terminal. The various types of data are coded and modulated by TX data processor 574 using the assigned carriers and further processed by a transmitter unit 576 to generate an uplink modulated signal that is then transmitted from antenna 552.

At AP 110x, the transmitted and modulated signals from the ATs are received by antenna 518, processed by a receiver unit 532, and demodulated and decoded by an RX data processor 534. Receiver unit 532 may estimate the received signal quality (e.g., the received signal-to-noise ratio (SNR)) for each terminal and provide this information to controller 520. Controller 520 may then derive the PC commands for each terminal such that the received signal quality for the terminal is maintained within an acceptable range. RX data processor 534 provides the recovered feedback information (e.g., the required transmit power) for each terminal to controller 520 and scheduler 530.

Scheduler 530 may provide an indication to controller 520 to maintain the resources. This indication is provided if more data is scheduled to be transmitted. For the AT 120x, the controller 560 may determine if resources required to be maintained. In certain aspects, controller 520 may perform instructions that provide the functionality of scheduler 530.

Further, controller 560 may perform all or some of the functions discussed with respect to FIGS. 1-5 with respect to the access terminal.

The techniques described herein may be implemented by various means. For example, these techniques may be implemented in hardware, software, or a combination thereof. For a hardware implementation, the processing units (e.g., controllers 520 and 560, TX and RX processors 514 and 534, and so on) for these techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that include the instructions that may be implemented by one or more processors to perform the functions described herein. The instructions may be stored in memory units, e.g., memory 522 in FIG. 7, on a removable media, or the like that may be read and executed by one or more processors (e.g., controllers 520). The memory unit(s) may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of assigning resources to multiple access terminals comprising:
generating a first assignment for a first access terminal, the first assignment identifying first resources;
generating a second assignment for a second access terminal, the second assignment being a conditional assignment identifying the first resources; and
identifying utilization of the conditional assignment with a no information signal transmitted during a gap in a transmission or reception of data between the first access terminal and the first resources, wherein identifying utilization occurs after generating the second assignment, and wherein the no information signal indicates that no transmission is occurring over the first resources identified by the first assignment.

2. The method of claim 1, wherein the no information signal corresponds to an erasure signature.

3. The method of claim 1, wherein generating the first assignment comprises generating the first assignment for reverse link communication.

4. The method of claim 1, wherein generating the first assignment comprises generating the first assignment for forward link communication.

5. The method of claim 1, wherein generating the first assignment comprises generating the first assignment for forward link and reverse link communication.

6. A method of processing signals received at an access terminal, the method comprising:
receiving a conditional assignment for a communication resource;
determining whether a no information signal is received corresponding to the communication resource, wherein the no information signal corresponds to a gap in transmission or reception of data between another access terminal and the communication resource, wherein the no information signal is received after receiving the conditional assignment, and wherein the no information signal indicates that no transmission is occurring over the communication resource;
determining whether the access terminal is conditionally assigned the communication resource for which the no information signal has been received; and
utilizing the communication resources if the no information signal is received and the access terminal is conditionally assigned the communication resource.

7. The method of claim 6, wherein determining whether the no information signal is received comprises determining if the no information signal including a sector identification is received.

8. The method of claim 6, wherein determining whether the no information signal is received comprises determining if an erasure signature is received.

9. The method of claim 6, wherein determining whether the no information signal is received comprises determining if the no information signal including a device identification of the access terminal is received.

10. The method of claim 6, wherein the utilizing step comprises demodulating signals received over the communication resource.

11. The method of claim 10, wherein determining whether the no information signal is received comprises determining whether the no information signal is transmitted over the communication resource.

12. The method of claim 6, wherein the utilizing step comprises transmitting signals over the communication resource.

13. The method of claim 6, further comprising transmitting an acknowledgement for signals received over the communication resource.

14. The method of claim 13, wherein transmitting the acknowledgement comprises transmitting the acknowledgement over a resource corresponding to the communication resource.

15. The method of claim 13, wherein transmitting the acknowledgement comprises transmitting the acknowledgement over a channel corresponding to a lowest node of a channel tree associated with the communication resource.

16. An apparatus comprising:
a memory; and
a processor configured to generate a first assignment for a first access terminal, the first assignment identifying first resources, and to generate a second assignment for a second access terminal, the second assignment being conditional and identifying the first resources, and the processor is further configured to identify the second assignment to be conditional based upon a no information signal transmitted during a gap in a transmission or reception of data between the first access terminal and the first resources, wherein the processor is configured to identify the second assignment to be conditional based upon the no information signal after generating the second assignment, and wherein the no information signal indicates that no transmission is occurring over the first resources identified by the first assignment.

17. The apparatus of claim 16, wherein the processor is configured to generate the no information signal as an erasure signature.

18. The apparatus of claim 16, wherein the first resources correspond to reverse link communication resources.

19. The apparatus of claim 16, wherein the first resources correspond to forward link communication resources.

20. The apparatus of claim 16, wherein the first resources correspond to forward link and reverse link communication resources.

21. An access terminal comprising:
a memory; and
a processor configured to receive a conditional assignment for a communication resource, to determine whether the access terminal is conditionally assigned communication resource for which a no information signal has been received, and to instruct utilizing the communication resources if the no information signal is received and the access terminal is conditionally assigned the communication resource, wherein the no information signal corresponds to a gap in transmission or reception of data between another access terminal and the communication resource, wherein the no information signal is received after receiving the conditional assignment, and wherein the no information signal indicates that no transmission is occurring over the communication resource.

22. The access terminal of claim 21, wherein the processor is configured to determine if the no information signal is received if it includes an appropriate sector identification.

23. The access terminal of claim 21, wherein the processor is configured to determine if the no information signal is received if it comprises an erasure signature.

24. The access terminal of claim 21, wherein the processor is configured to determine if the no information signal is received if it includes an appropriate device identification of the access terminal.

25. The access terminal of claim 21, wherein the processor is configured to instruct demodulating signals received over the communication resource.

26. The access terminal of claim 25, wherein the processor is configured to determine if the no information signal is received if the no information signal is transmitted over the communication resource.

27. The access terminal of claim 21, wherein the processor is configured to instruct transmitting signals over the communication resource.

28. The access terminal of claim 21, wherein the processor is configured to instruct transmitting an acknowledgement for signals received over the communication resource.

29. The access terminal of claim 28, wherein the processor is configured to instruct transmitting the acknowledgement comprises transmitting the acknowledgement over a resource corresponding to the communication resource.

30. The access terminal of claim 28, wherein the processor is configured to instruct transmitting the acknowledgement over a channel corresponding to a lowest node of a channel tree associated with the communication resource.

31. An apparatus for assigning resources to multiple access terminals comprising:
means for determining whether a communication resource may be conditionally assigned to at least one of the multiple access terminals in communication with an access point; and
means for providing one or more conditional assignments, to the at least one of the multiple access terminals, to some or all of the communication resource that may be conditionally assigned, wherein the one or more conditional assignments is identified as being conditional based upon a no information signal transmitted during a gap in transmission or reception of data between another access terminal and the communication resource, wherein identifying the one or more conditional assignments as being conditional based upon the no information signal occurs after providing the one or more conditional assignments, and wherein the no information signal indicates that no transmission is occurring over the communication resource.

32. The apparatus of claim 31, wherein the no information signal corresponds to an erasure signature.

33. The apparatus of claim 31, wherein the communication resource corresponds to reverse link communication.

34. The apparatus of claim 31, wherein the communication resource corresponds to forward link communication.

35. The apparatus of claim 31, wherein the communication resource corresponds to forward link and reverse link communication.

36. An apparatus for processing signals received at an access terminal, the apparatus comprising:
means for receiving a conditional assignment for a resource;

means for determining whether a no information signal is received, wherein the no information signal corresponds to a gap in transmission or reception of data between another access terminal and the resource, wherein the no information signal is received after receiving the conditional assignment, and wherein the no information signal indicates that no transmission is occurring over the resource;

means for determining an identity of the resource subject to the no information signal;

means for determining whether the access terminal has a conditional assignment for the identified resource; and means for utilizing the resource, if there is the conditional assignment.

37. The apparatus of claim 36, wherein the no information signal includes a sector identification.

38. The apparatus of claim 36, wherein the no information signal corresponds to an erasure signature.

39. The apparatus of claim 36, wherein the no information signal includes a device identification of the access terminal.

40. The apparatus of claim 36, further comprising means for demodulating signals received over the resource.

41. The apparatus of claim 36, wherein the signals and the no information signal are transmitted over the resource.

42. The apparatus of claim 36, wherein the means for communicating comprises means for transmitting signals over the resource.

43. The apparatus of claim 36, further comprising means for transmitting an acknowledgement for signals received over the resource.

44. A non-transitory processor readable medium including instructions thereon comprising:

instructions for determining whether a communication resource may be conditionally assigned to other access terminals in communication with an access point; and instructions for providing one or more conditional assignments, to one or more access terminals, to some or all of the communication resource that may be conditionally assigned, wherein the one or more conditional assignments is identified to be conditional based upon a no information signal corresponding to a gap in transmission or reception of data between another access terminal and the communication resource, wherein identifying the one or more conditional assignments to be conditional based upon the no information signal occurs after providing the one or more conditional assignments, and wherein the no information signal indicates that no transmission is occurring over the communication resource.

45. The medium of claim 44, wherein the no information signal corresponds to an erasure signature.

46. A non-transitory processor readable medium including instructions thereon comprising:

instructions for receiving a conditional assignment for a resource;

instructions for determining whether a no information signal is received, wherein the no information signal is received after receiving the conditional assignment, and wherein the no information signal indicates that no transmission is occurring over the resource;

instructions for determining an identity of the resource subject to the no information signal;

instructions for determining whether an access terminal has a conditional assignment for the identified resource based on the no information signal, wherein the no information signal corresponds to a gap in transmission or reception of data between another access terminal and the resource; and instructions for communicating, utilizing the resource, if there is the conditional assignment.

47. The medium of claim 46, wherein the no information signal includes a sector identification.

48. The medium of claim 46, wherein the no information signal corresponds to an erasure signature.

49. The medium of claim 46, wherein the no information signal includes a device identification of the access terminal.

50. The medium of claim 46, wherein the signals and the no information signal are transmitted over the resource.

51. The medium of claim 46, further comprising instructions for transmitting an acknowledgement for signals received over the resource.

* * * * *